United States Patent
Link

[11] Patent Number: 5,899,015
[45] Date of Patent: May 4, 1999

[54] FISHING JIG WITH RECESSED SKIRT

[76] Inventor: Donald J. Link, 1053 Legion St., Shakopee, Minn. 55379

[21] Appl. No.: 08/839,258

[22] Filed: Apr. 17, 1997

[51] Int. Cl.[6] .................................................. A01K 85/00
[52] U.S. Cl. ...................... 43/42.39; 43/42.37; 43/42.28
[58] Field of Search ............................... 43/42.39, 42.37, 43/42.28, 42.4, 42.43, 44.8, 44.81, 42.29

[56] References Cited

U.S. PATENT DOCUMENTS

| | | | |
|---|---|---|---|
| 2,237,534 | 4/1941 | Van Der Clute | 43/42.28 |
| 4,317,305 | 3/1982 | Firmin | 43/42.28 |
| 5,231,786 | 8/1993 | Hughes | 43/42.39 |
| 5,396,728 | 3/1995 | Weber | 43/42.37 |
| 5,588,247 | 12/1996 | Wicht | 43/42.28 |
| 5,630,289 | 5/1997 | Dotson | 43/42.39 |

*Primary Examiner*—Thomas B. Will
*Assistant Examiner*—Arpad Fabian Kovacs
*Attorney, Agent, or Firm*—D. L. Tschida

[57] ABSTRACT

A lead head jig constructed to shelter a multi-filament lure dressing and a fish line attachment. A variety of ellipsoid head configurations are disclosed which include a lateral channel that shelters a hook eye recessed into the head at the channel. The eye is variously positioned relative to a center vertical axis through the center of the head, e.g. rotated forward and at the vertical axis. The eye position and head shape cause the lure to roll and raise a barbed end of the hook as the lure is retrieved. A recess is concentrically aligned to a hook shank which lies along a horizontal plane at the center of the head and receives a multi-filament skirt. In alternative tapered head jig configurations, which also include recessed skirt cavities, the hook eye is recessed into a snout of the head. A concave surface extends below the eye to permit a rolling retrieve. A ridge is also formed aft of the eye in one tapered head construction. A weed guard projects to protect the hook barb. A ball head jig having a recessed hook eye, recessed skirt and adhesive bound attractant eyes is also disclosed.

23 Claims, 14 Drawing Sheets

FISHING JIG WITH RECESSED SKIRT

BACKGROUND OF THE INVENTION

The present invention relates to skirted fishing lures and, in particular, to so called "bass jigs" which are formed in various constructions to advantageously support a silicone rubber skirt at a cavity formed into the head, to recess a hook eye and shelter a fish line attachment and to provide a rolling retrieval action.

With the expanded popularity of sport fishing and, in particular, bass and walleye fishing has come myriad different lures. The lures are designed from varieties of materials and in varying shapes and colors to enable fishermen and women to present a variety of basic offerings or presentations for top water, mid-water and bottom fishing. Each presentation is tailored to a particular application, for example, the structure being fished, zone of fish suspension, the mood of the fish, or the weather. Colors and attractors are attached to accentuate the offerings. The different lures enhance the fisher person's ability to match conditions and entice a strike.

One common lure which is fished along the bottom of a lake or river is a lead head jig. Such lures typically provide a ¼ to 1 ounce lead head which is molded to an appropriate up-turned eye hook that can be sized up to 5/0. Large numbers of such jigs exist and which exhibit differing head designs, dressing attachment flanges and hook shapes, not to mention the attached dressings. The jigs are formed to accept and/or are fitted with various dressings, for example, wire forms and spinner blades, plastisol bodies and multi-filament skirts, to enhance movement or attractant qualities. Many are also constructed to provide audible sound and to include weed guards.

Large numbers of commercially available jigs can be found upon reference to available national and regional fishing tackle catalogs. Each catalog typically provides a number of jigs designed for different fish species. A cross section of the available jigs, which are particularly tailored to bass fishing, are shown in an article "Bass Jigs & Beyond" by Steve Quinn, *The In-Fisherman* (Vol. 19, No. 2, March, 1994, pp. 76–83).

In spite of the myriad numbers of different jigs, the hook eye is normally left exposed at the head. That is, the circular eye completely protrudes from an appropriate surface of the head. Any accessory eyelets, such as for attaching trailer or stinger hooks, are normally also positioned to be exposed. While an exposed eye facilitates fish line attachment, the line and knot are correspondingly exposed to abrasion, especially when fishing weeds, gravel, timber or other abrasive structure.

Most typically, the eye also extends at either 90 or 60 degrees from an axis taken along the shank of the hook. Sixty degrees accommodates straight line retrieval and 90 degrees accommodates erratic, jerking retrieves, which induce a hopping action at the jig.

Multi-filament skirts fitted to the jigs are also normally fitted to flanges that project from the aft end of the jig head. Barbs or an annular ridge may be provided at the flange. The skirts typically are threaded over the flange and positioned in abutment to the head. The skirts may or may not include a cylindrical collar from which a number of filaments trail. Depending upon the structure being fished, the exposed mounting of the skirt, subjects the skirt to abrasion, tearing and bite-off and consequent loss or damage to the skirt which requires replacement.

To overcome the foregoing deficiencies, the improved jigs of the invention were designed to recess the hook eye into the head to shelter the point of fish line attachment and to recess the collar of a skirt dressing into the jig head. Lure and skirt breakoff are thereby minimized.

SUMMARY OF THE INVENTION

It is a primary object of the invention to provide a fishing jig lure having a head designed to minimize line breakage and prevent premature release of attached filamentary dressings.

It is a further object of the invention to provide a jig lure having a head containing a line attachment eye which is recessed into a slot or channel at the head.

It is a further object of the invention to provide a concave surface beneath the line attachment point and about which the jig head can pivot or roll to stand a hook barb upright during retrieval.

It is a further object of the invention to provide a jig head having a recess which accepts and shelters a collar of a multi-filament skirt.

It is a further object of the invention to provide a jig head having a recess concentrically aligned to a dressing attachment flange molded over a hook shank and which recess is adapted to contain a skirt dressing.

It is a further object of the invention to provide an ellipsoid jig head having a hook eye recessed into a channel forward of a vertical axis through the center of the jig head and a cavity concentrically aligned to a hook shank to receive a multi-filament skirt.

It is a further object of the invention to provide a tapered jig head having a hook eye recessed into the head forward of a vertical axis through the center of the head and including a cavity concentrically aligned to a hook shank to receive a multi-filament skirt.

It is a further object of the invention to provide a round jig head having a recessed hook eye, skirt cavity and a number of plastic eyes.

Various of the foregoing objects, advantages and distinctions of the invention are obtained in a number of jig head constructions. In various ellipsoid or "football" shaped heads, the eye of a hook is molded into the head and exposed at a channel that extends to either side of the eye. A recessed cavity extends into the head coaxial with a hook shank and supports a filamentary skirt dressing. A barbed flange also supports the dressing.

In another "football" jig, the hook eye is exposed and a barbed flange extends along the hook shank coaxial to a recessed cavity which supports a filamentary skirt dressing.

Tapered jig heads are also provided having hook eyes molded into the head forward of a vertical axis through the center of the head. A barbed flange extends along a hook shank and is concentrically aligned to a cavity which receives a multi-filament skirt. A weed guard projects from the head to shelter a hook barb. In one tapered jig head, a ridged back extends aft of a recessed eye.

A round head jig head is also disclosed which supports a recessed hook eye, a recessed skirt cavity and a pair of plastic eyes which are bonded to the head.

Still other objects, advantages and distinctions of the invention, as well as other constructions are more apparent at the following description with respect to the appended drawings. To the extent similar structure appears at the drawings, they are identified with similar reference characters or numerals. Various considered modifications and improvements are also described as appropriate. The scope of the invention should not be literally construed nor limited by the disclosed constructions. Rather, the invention should be interpreted to include all those equivalent constructions within the scope of the further amended claims.

DESCRIPTION OF THE PREFERRED EMBODIMENT

With attention to FIGS. 1 through 7, views are shown to a jig type fishing lure 2. The lure 2 provides a head 4 that is molded to a hook 6. The head 4 exhibits an ellipsoid shape, particularly a so called "football" shape. The head 4 is typically molded from lead, but can be molded from any of a variety of other materials which provide suitable weight and durability.

An appendage or dressing retainer 8 extends aft of the head 4 and supports a barbed flange 10 and annular flange or collar 12. The appendage 8 projects along a shank 14 of the hook 6, forward of a barb 15. A recess 16 also extends into the head 4, reference FIG. 2. The recess 16 is molded to lie concentric and coaxial to the appendage 8.

An eye 18 of the hook 6 is molded into a channel 20. The eye 18 is positioned at an angle "A" in the range of 10 to 30 degrees forward of a vertical axis 22 or 70 to 80 degrees from a horizontal axis 24 through the center of the head, reference FIG. 2. The eye 18 lies above the horizontal axis 24, which axis 24 also extends through the center of the head 4 and is coaxial to the shank 14. The eye 18 is recessed into the channel 20 such that the top of the eye 18 lies tangent to the surface of the head 4. Upon securing a fish line 21 to the eye 18, an attachment knot 23 of the line 21 is protected by the channel 20 and only the multiple wraps of the knot 23 are exposed. Potential abrasion and line breakage are thereby reduced.

The weight of the head 4 causes the hook 6 to lie with the eye 18 rotated up, when resting on the bottom of a lake bed. Upon retrieving the jig 2 with light slow pulls on an attached fish line, the head 4 is rolled forward and down to raise the barb 15 and better present the barb 15 to a quarry fish. The head 4 particularly pivots or rolls along the convex surface 25 beneath the eye 18.

Figure 1:
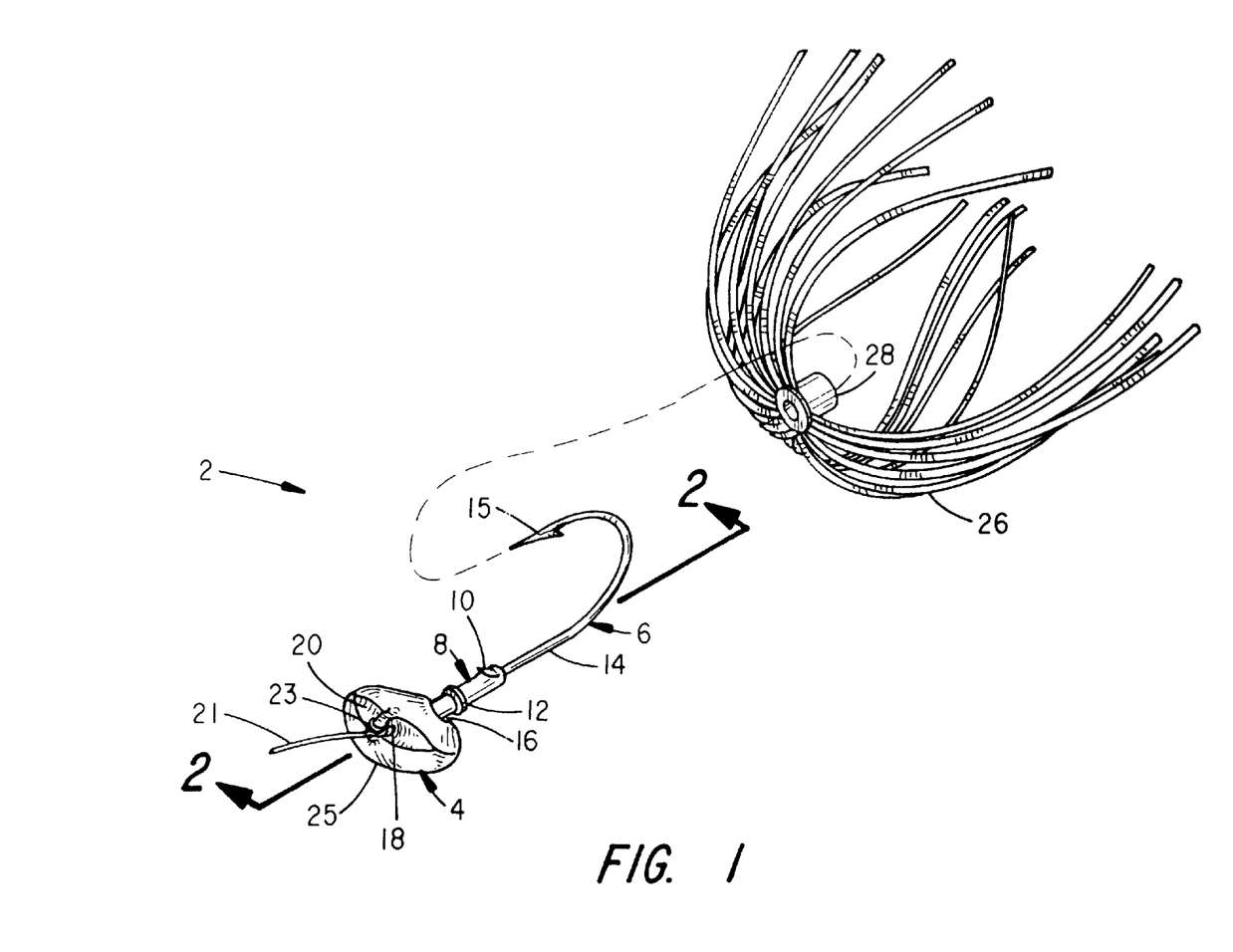
FIG. 1 is a perspective drawing shown in exploded assembly to "football" shaped fishing jig and multi-filament skirt which mounts to a coaxial recess aligned to the hook shank.
Figure 2:
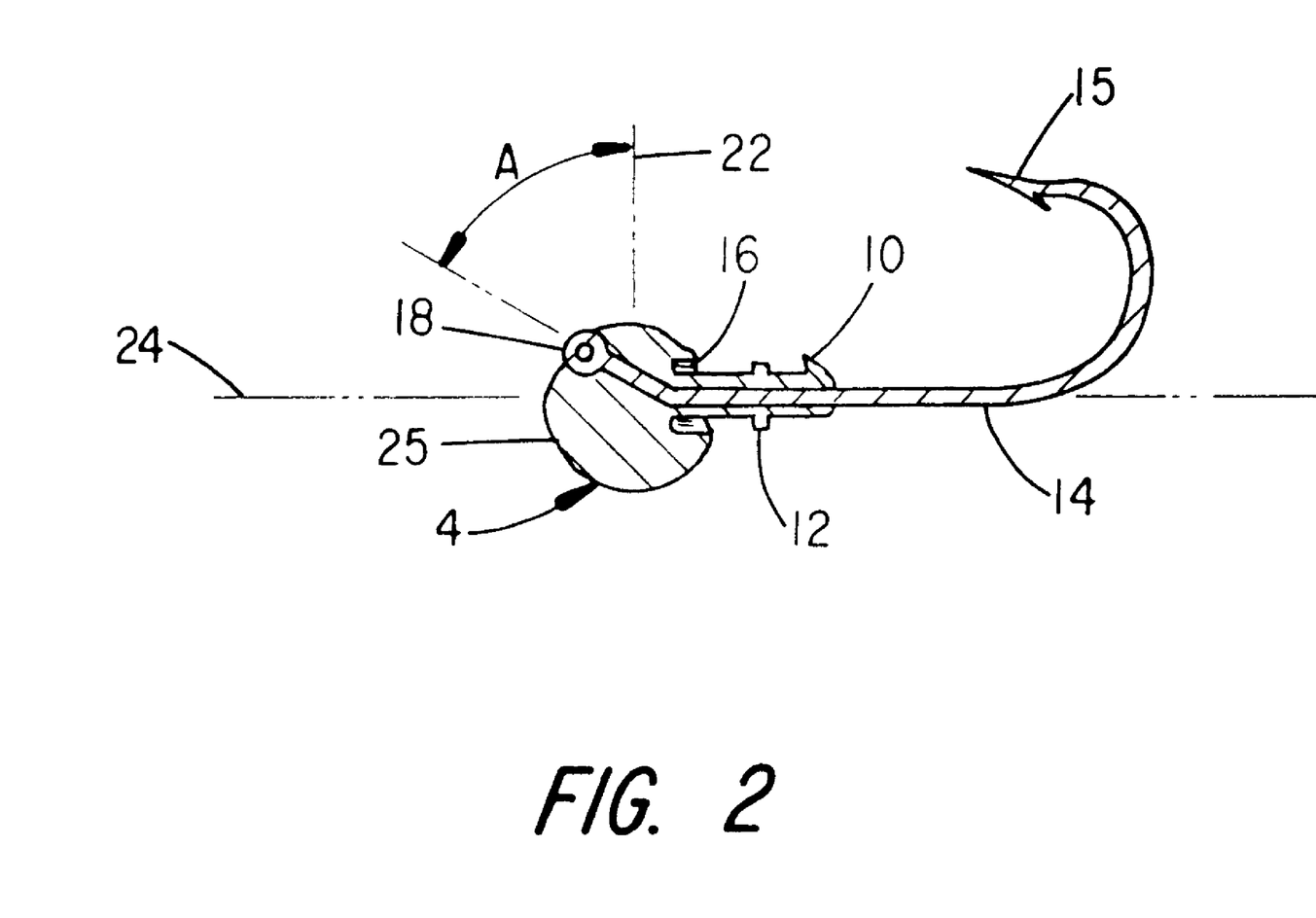
FIG. 2 is a cross section view taken along section lines 2—2 of FIG. 1.
Figure 3:
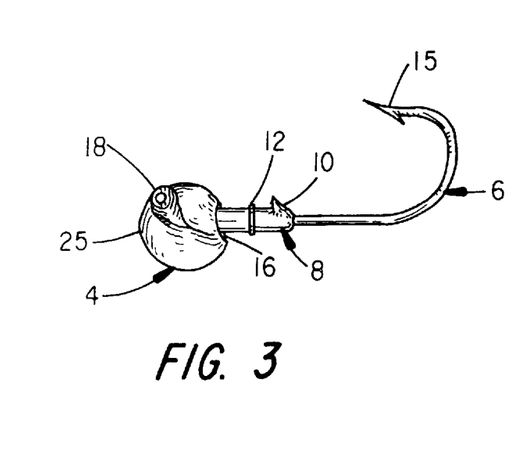
FIG. 3 shows a right side elevation view of the jig head of FIG. 1 and the left side view of which is identical.
Figure 4:
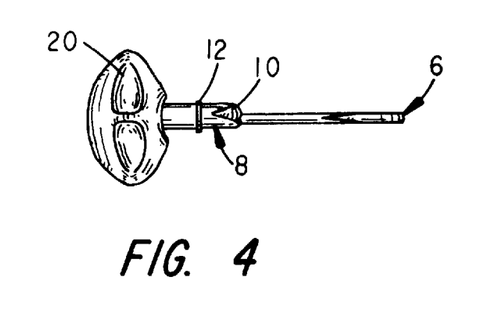
FIG. 4 is a top view of the jig head of FIG. 1.
Figure 5:
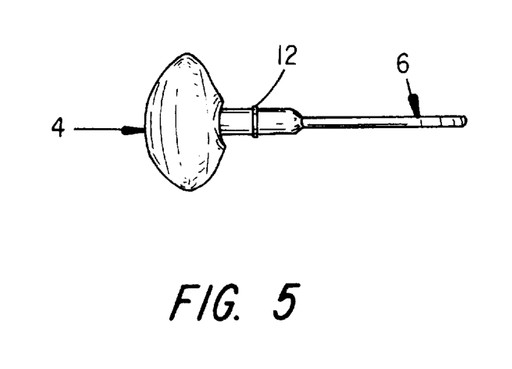
FIG. 5 is a bottom view of the jig head of FIG. 1.
Figure 6:
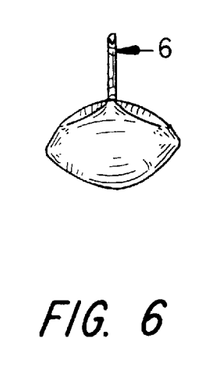
FIG. 6 is a front end view of the jig head of FIG. 1.
Figure 7:
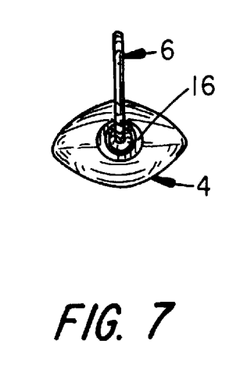
FIG. 7 is a rear end view of the jig head of FIG. 1.
Figure 8:
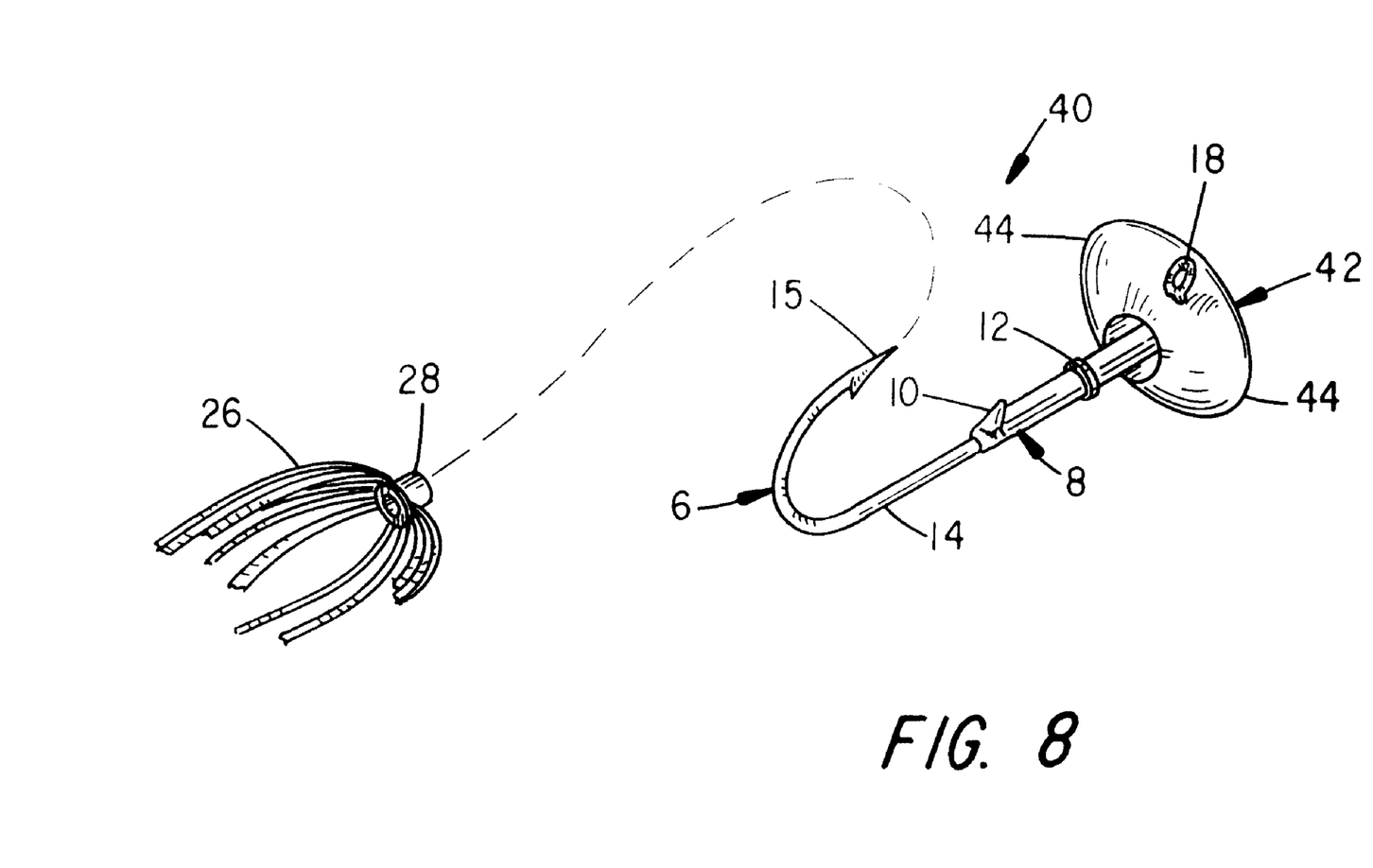
FIG. 8 is a perspective drawing of a football jig head having a skirt recess.
Figure 9:
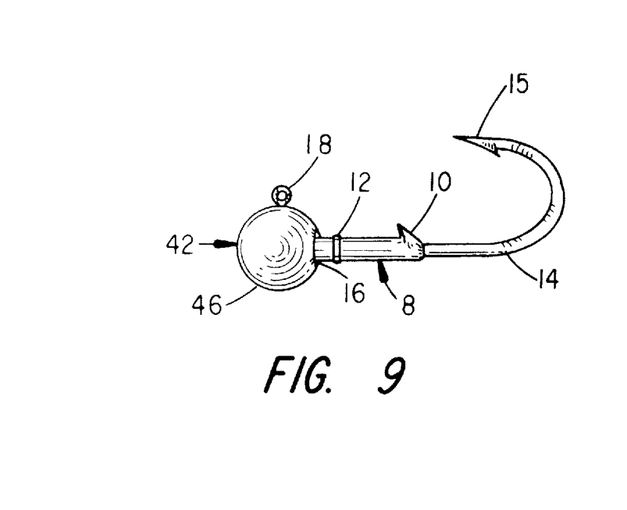
FIG. 9 shows a right side elevation view of the jig head of FIG. 8 and the left side view of which is identical.
Figure 10:
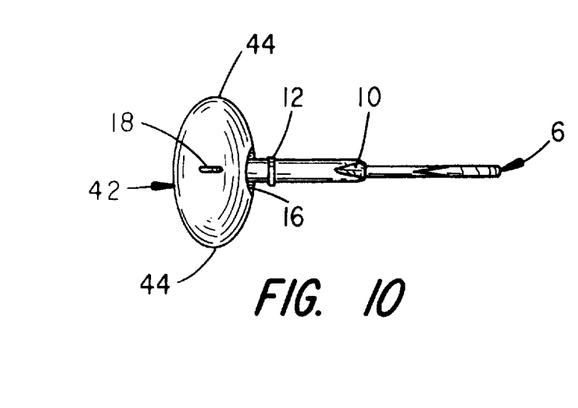
FIG. 10 is a top view of the jig head of FIG. 8.
Figure 11:
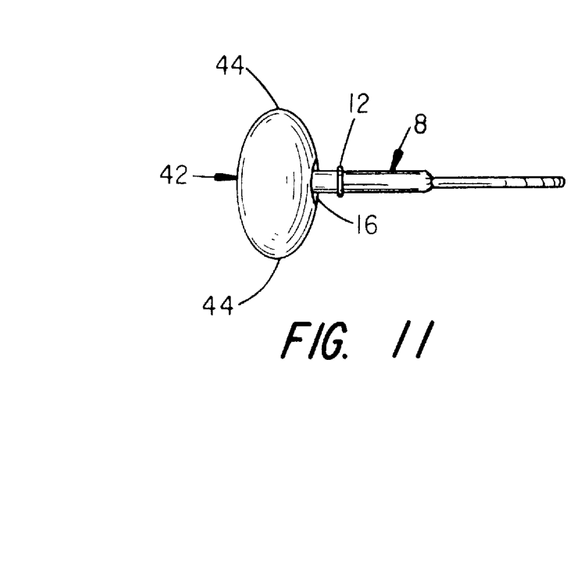
FIG. 11 is a bottom view of the jig head of FIG. 8.
Figure 12:
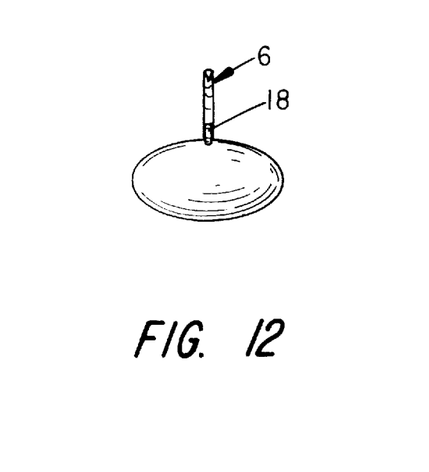
FIG. 12 is a front end view of the jig head of FIG. 8.
Figure 13:
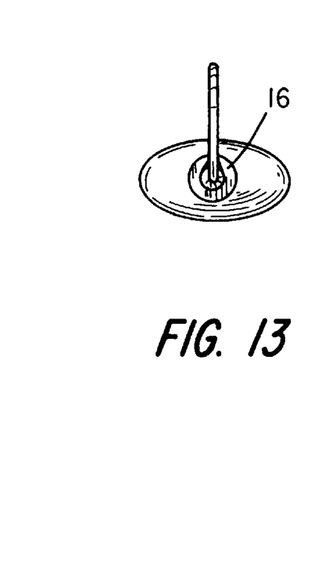
FIG. 13 is a rear end view of the jig head of FIG. 8.

The barb 15 is normally obscured with a multi-filament skirt 26 that is threaded over the hook 6 and appendage 8, reference FIG. 1. A cylindrical collar 28 of the skirt 26 is fitted over the appendage 8, the barb 10 and annular collar 12, until the collar 28 nests into the recess 16. The collar 12 prevents the collar 28 from withdrawing from the recess 16 and the recess 16 protects the skirt 26 from being torn or bitten off, such as by a northern pike or other toothy fish. Silicone rubber skirts 26 are presently preferred for their durability and ability to maintain their colorations.

Figure 15:
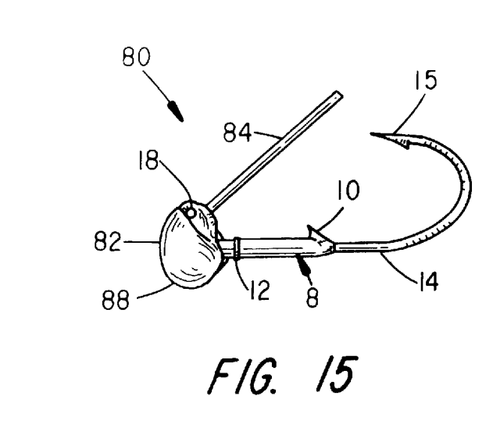
FIG. 15 shows a right side elevation view of the jig head of FIG. 14 and the left side view of which is identical.
Figure 16:
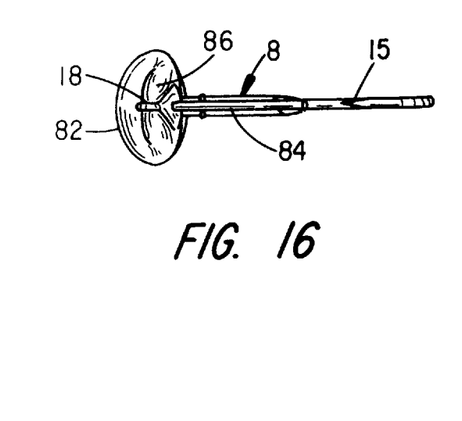
FIG. 16 is a top view of the jig head of FIG. 14.
Figure 17:
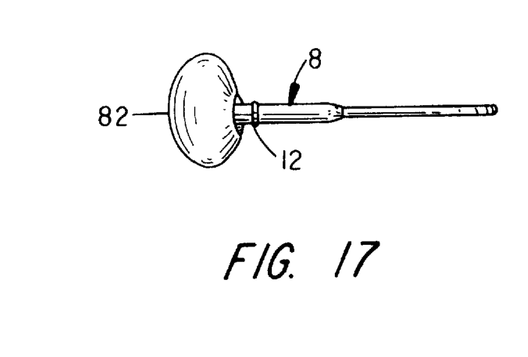
FIG. 17 is a bottom view of the jig head of FIG. 14.
Figure 18:
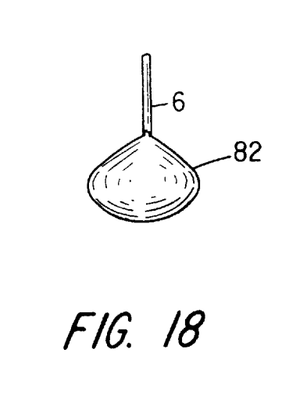
FIG. 18 is a front end view of the jig head of FIG. 14.
Figure 19:
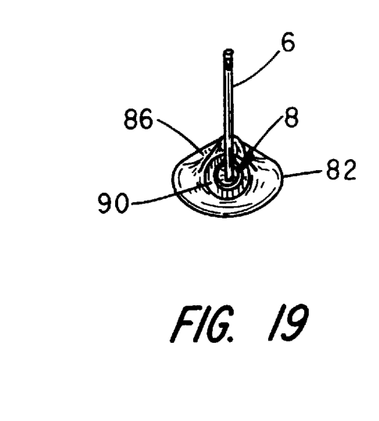
FIG. 19 is a rear end view of the jig head of FIG. 14.

The barb 10 separately retains a live bait or attractant dressing to the shank 14. Varieties of plastisol dressings are available for enhancing jigs and an exemplary crawfish shaped dressing 32 is shown at FIG. 15. Such dressings are retained to the appendage 8 by the barb 10. Numerous other commercial dressings can alternatively be applied alone or in any desired combination to the hook 6.

Although the jig 2 is configured with a football shaped head 4, any of a variety of ellipsoid shapes can be provided at the jig 2. The hook 6 extends transverse to the head 4 with apexes of the head 4 laterally displaced from the hook 6 to stabilize the jig 2 and provide a rolling action described above.

Such shapes might also be non-symmetrical. Preferably, however, any head 4 should exhibit a surface 25 upon which the head 4 can be pivoted. More of the details to the shape of the head 4 are apparent from FIGS. 3 through 7.

Figure 14:
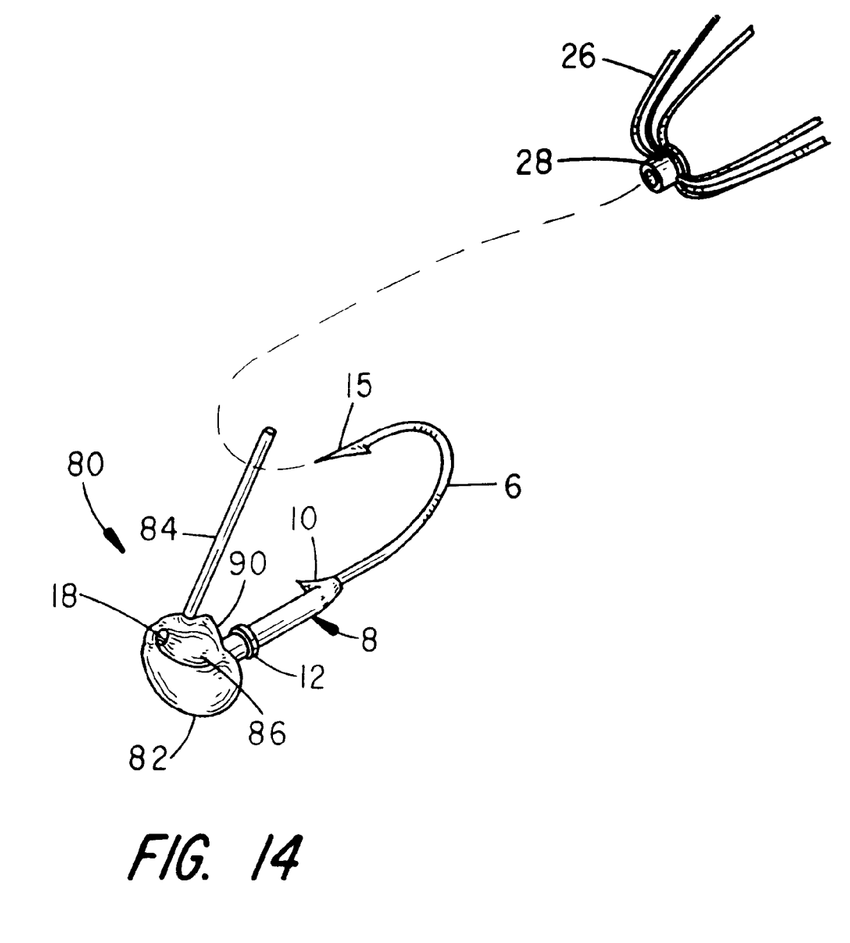
FIG. 14 is a perspective drawing of a football jig head having an eye recessed at the vertical center of the head and a skirt recess.

A variety of surface ornamentation might also be applied or molded into the surfaces of the head 4. Although a molded appendage 8 is provided with the head 2, it might be deleted in other head constructions. A weed guard 84 might also be fitted to the head 4, such as in the manner of the jig head of FIG. 14.

FIGS. 8 through 13 depict another ellipsoid head jig 40. The head 42 of the jig 40 also exhibits a general "football" shape, although the lateral ends 44 are rounded versus pointed in the jig 2. The hook eye 18 is also exposed and projects at 90 degrees to the shank 14. An appendage 8 extends from the head 42 and contains an annular collar 12 and barb 10. A recess 16 is coaxially aligned to the shank 14. The recess 16 protects a skirt 26 which is fitted to the hook 6 and forward of the collar 12 at the appendage 8.

The jig 40 is fished in substantially the same fashion as the jig 2, that is, with a rolling action along the surface 46. Exposure of the eye 18 facilitates molding, although with potentially greater line breakage when the jig is fished under most intended conditions and which typically include frequent encounters with abrasive weeds, wood and rocks.

FIGS. 14 through 19 depict still another jig 80 having a modified ellipsoid head 82. A single strand weed guard 84 extends from the head 82 to protect the hook barb 15. The hook eye 18 projects at 90 degrees to the shank 14 and is sheltered in a channel 86. The eye 18 and channel 86 are positioned at the aft end of the head 82, which provides a more radical rolling surface 88, reference FIG. 15. That is, the fulcrum point of the surface 88 induces a faster and more vertical tipping of the barb 15. A cylindrical cavity 90 is positioned concentric to a dressing attachment appendage 8 and extends into the head 82 to receive a multi-filament skirt.

Appreciating the advantages of the recessed line attachments and recessed skirts 26 at the jig heads 2, 42 and 90, FIGS. 20 through 26 and FIGS. 27 through 32 depict alternative tapered head jigs 50 and 60. The jigs 50 and 60 are shaped to accommodate weedier fishing conditions with more swimming action, that is, longer duration pulling or extended retrieval of the fish line 21. Each of the jigs 50 and 60 therefore includes a multi-bristled weed guard 30 which is molded in conventional fashion into the tapered heads 52 and 62 and aligned to shelter the barb 15 of the hooks 6. The heads 52 and 62 are also formed without distinct lateral sides to reduce the surface area that can encounter weeds. A tapered presentation is thus provided, although the weight of the jigs are typically still provided in ranges of ¼ to 1 ounce.

Figure 20:
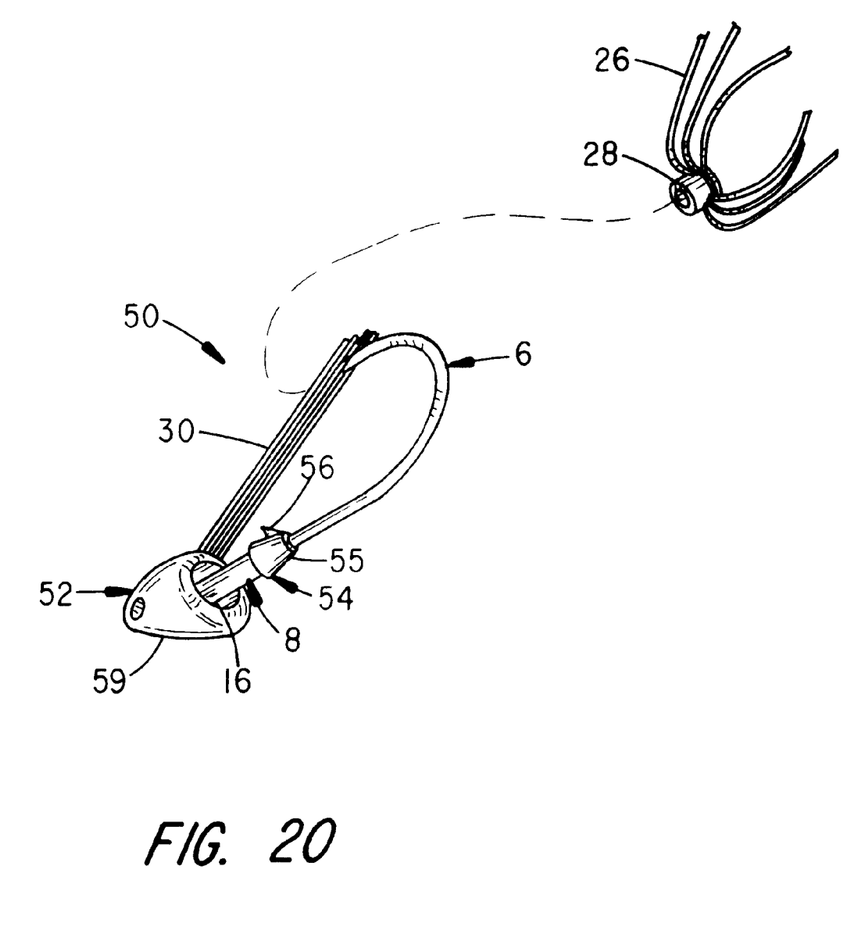
FIG. 20 is a perspective drawing of a tapered jig head having a skirt recess and a weed guard.
Figure 21:
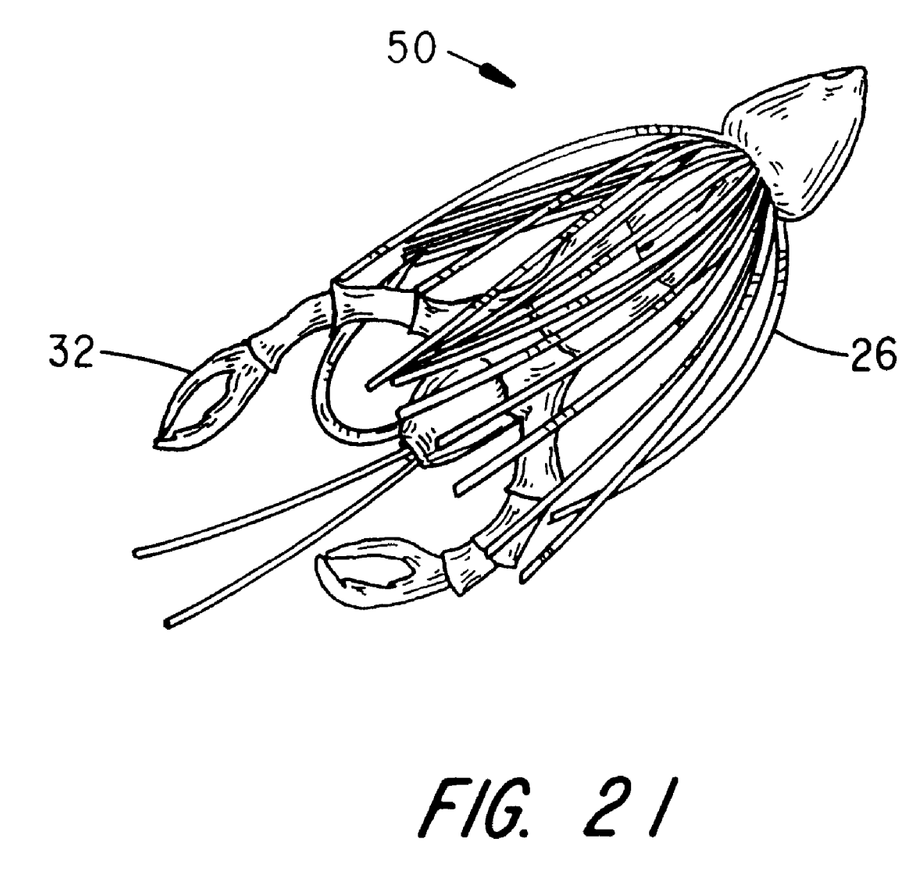
FIG. 21 is a perspective drawing of the jig head of FIG. 20 outfitted with a multi-filament skirt and plastisol body dressing mounted to the shank.
Figure 22:
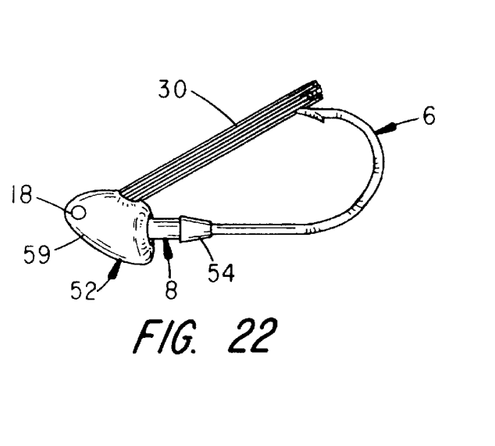
FIG. 22 shows a right side elevation view of the jig head of FIG. 20 and the left side view of which is identical.
Figure 23:
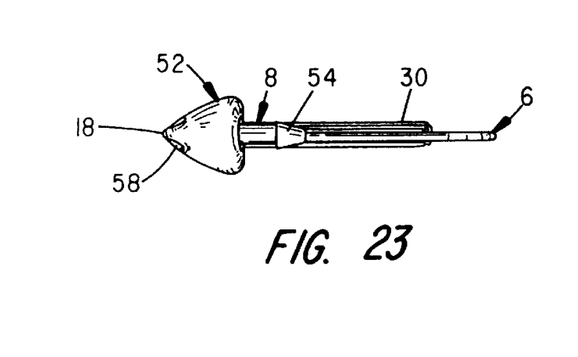
FIG. 23 is a bottom view of the jig head of FIG. 20.
Figure 24:
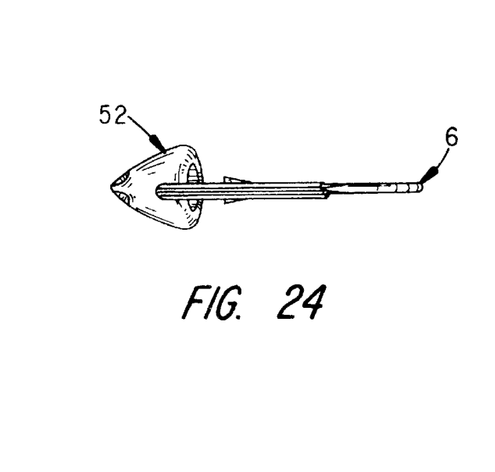
FIG. 24 is a top view of the jig head of FIG. 20.
Figure 25:
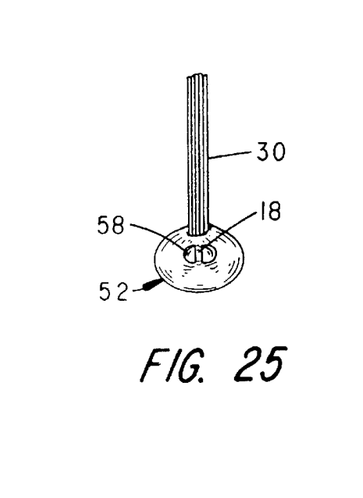
FIG. 25 is a front end view of the jig head of FIG. 20.
Figure 26:
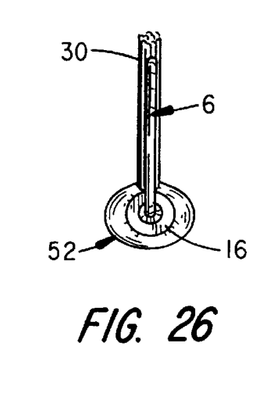
FIG. 26 is a rear end view of the jig head of FIG. 20.
Figure 27:
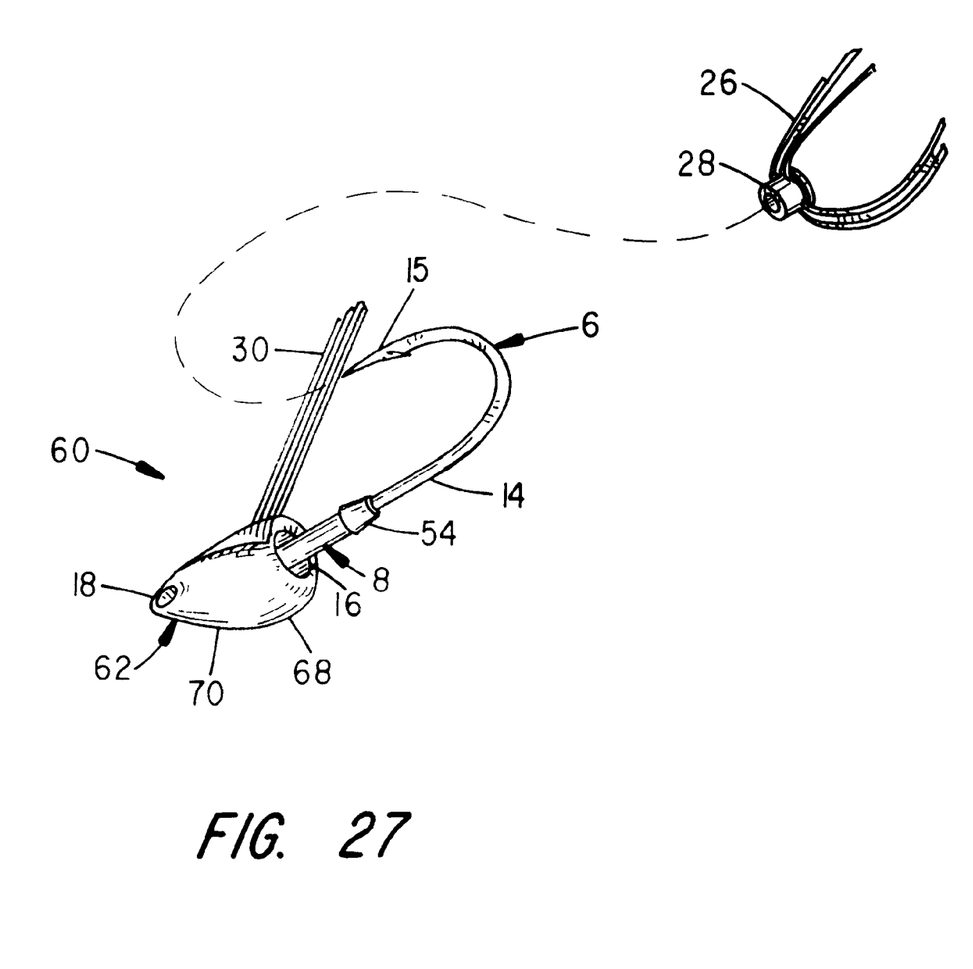
FIG. 27 is a perspective drawing of a tapered jig head having a ridged back and skirt recess.
Figure 28:
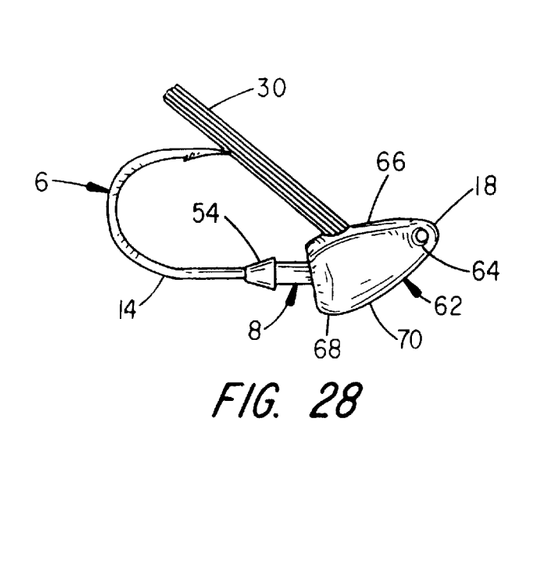
FIG. 28 shows a left side elevation view of the jig head of FIG. 27 and the right side view of which is identical.
Figure 29:
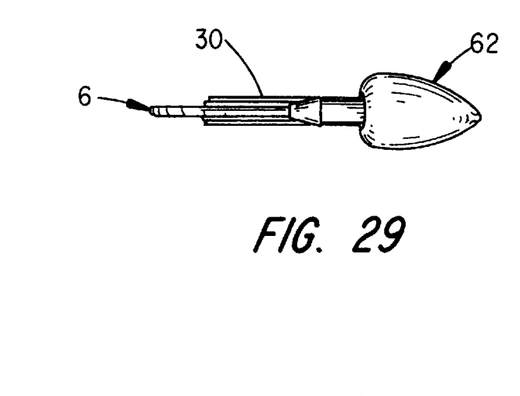
FIG. 29 is a bottom view of the jig head of FIG. 27.
Figures 30, 31:
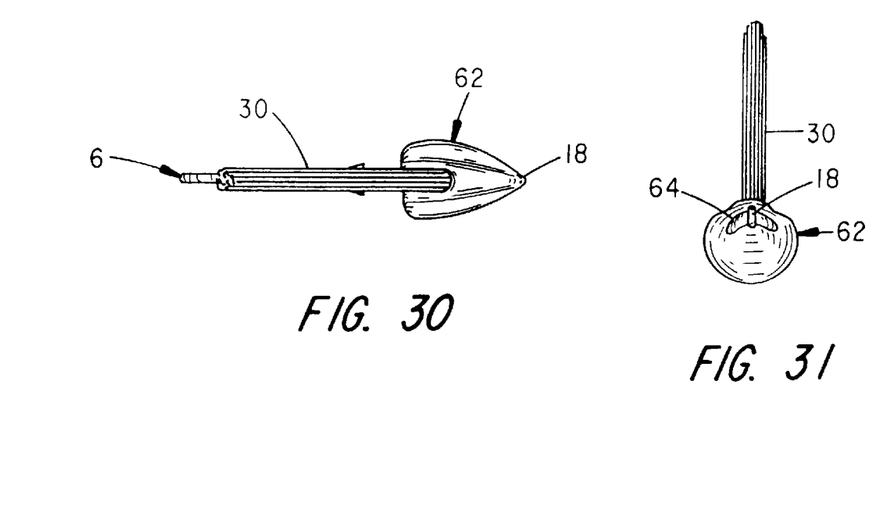
FIG. 30 is a top view of the jig head of FIG. 27.
FIG. 31 is a front end view of the jig head of FIG. 27.
Figure 32:
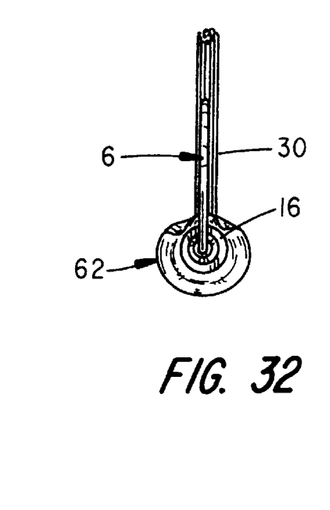
FIG. 32 is a rear end view of the jig head of FIG. 27.
Figure 33:
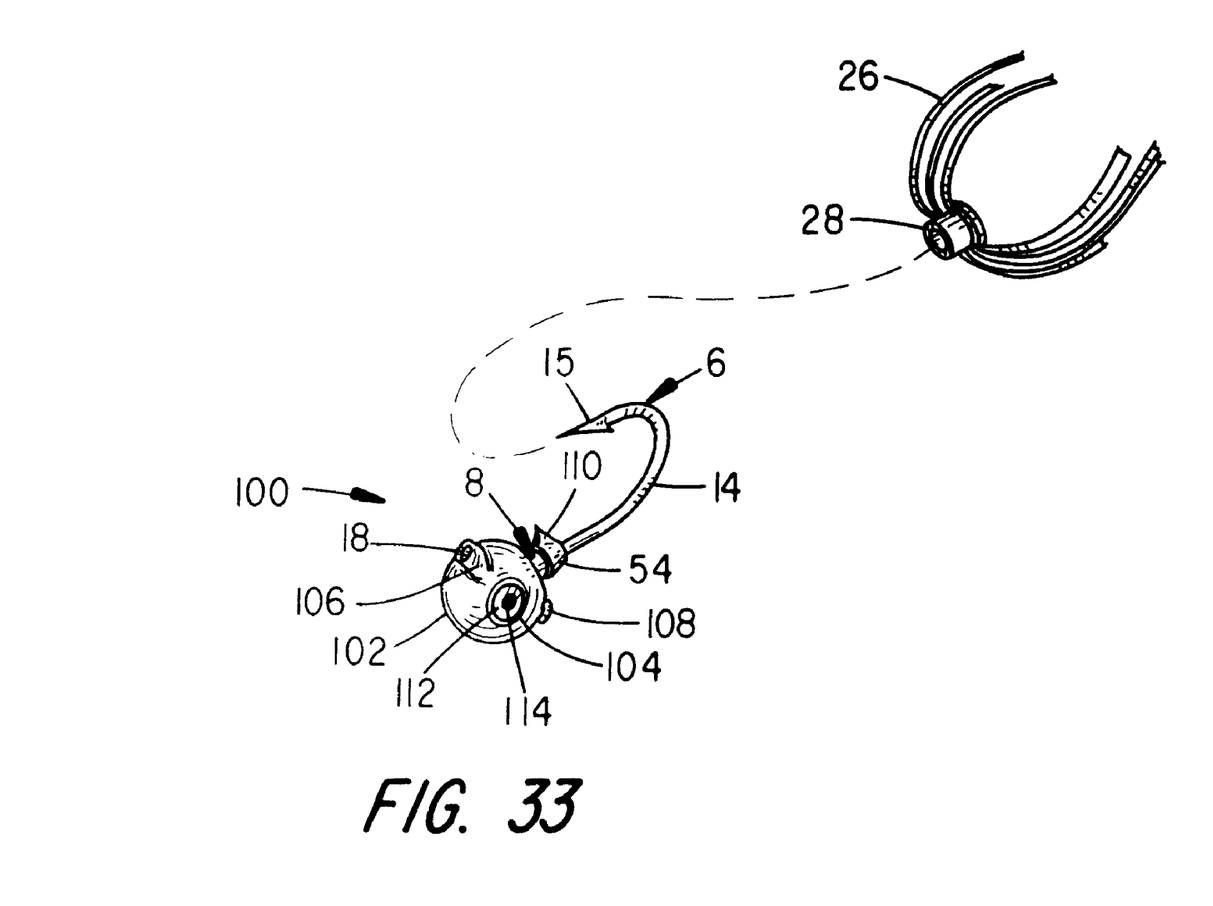
FIG. 33 is a perspective drawing of a round jig head having a recessed hook eye, plastic attractant eyes and a skirt recess.
Figure 34:
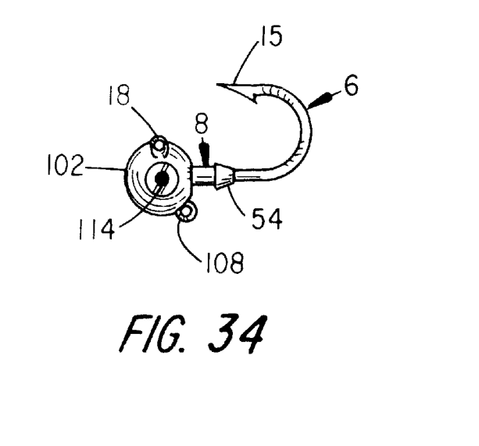
FIG. 34 shows a left side elevation view of the jig head of FIG. 33 and the right side view of which is identical.
Figure 35:
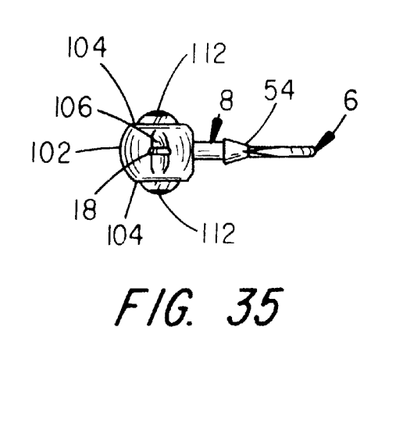
FIG. 35 is a bottom view of the jig head of FIG. 33.
Figure 36:
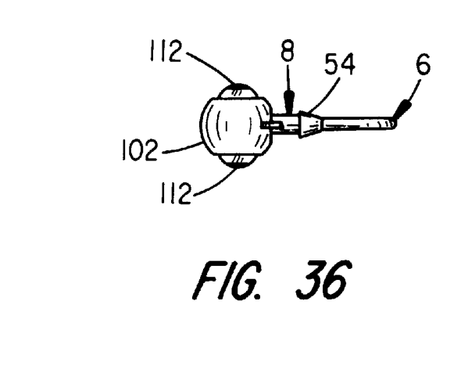
FIG. 36 is a top view of the jig head of FIG. 33.
Figure 37:
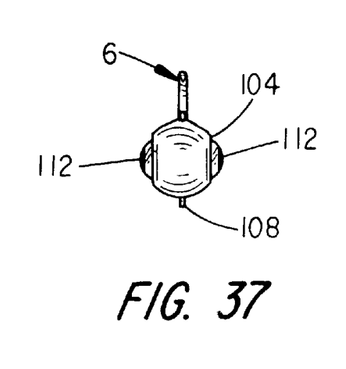
FIG. 37 is a front end view of the jig head of FIG. 33.
Figure 38:
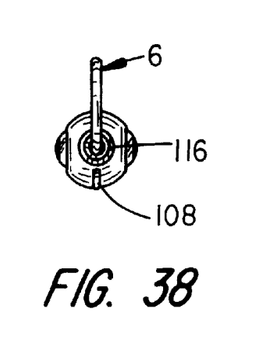
FIG. 38 is a rear end view of the jig head of FIG. 33.

With attention first directed to FIGS. 20 through 26, the jig 50 is shown at FIG. 20 as it typically is presented to a fish when contacting a lake bottom. The barb 15 is presented in a "standup" orientation. Suitable lure dressings are fitted to the hook 6, an exemplary arrangement of which are shown in FIG. 21. A multi-filament skirt 26 is normally supported to an appendage 8 that is cast over a portion of the shank 14 and forward of a tapered collar 54. A conical surface 55 of the collar 54 facilitates attachment of the skirt 26 to the appendage 8. A recess 16, which is coaxial and concentric with the shank 14, receives the collar 28 of the skirt 26. The recess 16 shelters the collar 28 against abrasion and bite-off and the collar 54 prevents the skirt 26 from sliding off the hook 6. A barb 56 might also be molded to the appendage 8 adjacent to or along the collar 54 to retain an attached live bait or dressing body 32 to the hook 6.

Sheltered into the forward end or snout of the head 52 is the hook eye 18. A slight channel 58 is provided to either side of the eye 18. The eye 18 can be positioned further aft to be completely sheltered by the head 52, although such a mounting necessitates a more pronounced channel 58 to accommodate the line knot. Preferably, the eye 18 should be closely positioned to the forward end of the head 52, yet be sheltered by the head 52 and the tapered sidewalls of which tend to steer obstructions away from the line attachment. The eye 18 is presently positioned forward in a range of 10 to 30 degrees of a vertical center axis through the head 52 versus a conventional 40 degree rotation. The present mounting of the eye 18 permits a rolling action.

A convex surface 59 is presented beneath the eye 18 to enhance the rolling action, albeit less action is obtained than with the jigs 2 and 40, since the jig 52 is intended more for weed presentations. The lack of pronounced lateral sides or apexes also reduces the stability of the jig 52 to a rolling action.

FIGS. 27 through 32 depict the tapered jig 60, which also recesses the eye 18 into the fore end of the head 62. A channel 64 is provided to either side of the eye 18. A longitudinal ridge 64 extends substantially parallel to the shank 14 and the weed guard 30 projects from the ridge 64. The additional material of the ridge 64 accommodates greater head weight. A skirt recess 16 is provided in concentric alignment to an appendage 8 and collar 54 that extend along the shank 14. A skirt dressing (not shown) is sheltered at the recess 16.

The weight distribution of the jig 60 is such that the head 62 rests at an aft surface 68 and from which position an adjoining convex surface 70 extends in a range of 45 to 60 degrees from horizontal to provide a more pronounce rolling action with lure retrieval than with the jig 50.

FIGS. 33 to 38 depict still another jig head 100 which exhibits a more traditional "round" head 102. Except for flat surfaces 104 at the sides of the head 102, the head 102 is round or spherical.

A hook 6 having a shorter shank 14 than for the jig heads 2, 40, 50, 60 and 90 is molded to the head 102, which makes the lure 100 more desirable for walleye fishing. The hook eye 18 is recessed into a channel 104 at the vertical center axis of the head 102. An accessory eye 108 extends beneath the shank 14 and an appendage 8 which supports a tapered collar 54. A barb 110 can be added at or adjacent the collar 54 as desired. A trailer hook (not shown) and other accessory dressings can be supported to the eye 108 and barb 110.

Supported to the flat surfaces 104 are a pair of plastic eyes 112. The pupil 114 of the eye 112 can be painted or fixed relative to the head 102. The pupil 114 might also be contained within a plastic housing which permits movement.

Extending into the head 102 is a cylindrical cavity 116 which is concentric to the appendage 8. The cavity 116 supports an attached multi-filament skirt 26 which normally is attached to the head 102.

While the invention has been described with respect to a number of presently considered and preferred jig head constructions, it is to be appreciated still other constructions may be suggested to those skilled in the art upon reference hereto. The invention should therefore be construed to include all those equivalent embodiments within the spirit and scope of the following appended claims.

What is claimed is:

1. A fishing lure comprising:
   a) a multi-filament skirt having a collar that extends from a first end of the skirt opposite to a second end; and
   b) a head molded about a fish hook, wherein the hook has an eye, a shank and a barb, wherein a cavity having a shape complementary to an external shape of said collar extends from an exterior surface of said head into said head a depth sufficient to receive said collar and define a void around the shank, and wherein the collar is mounted and substantially concealed from the exterior surface in the cavity and filaments of the second end are exposed and free to move relative to said head.

2. A lure as set forth in claim 1 wherein said eye is recessed into said head.

3. A lure as set forth in claim 1 including retainer means which projects from said head to retain and prevent premature withdrawal of the multi-filament skirt from said cavity.

4. A lure as set forth in claim 3 wherein said retainer means comprises an appendage which projects from the head coaxial to and along the shank and wherein the cavity is concentric to said appendage.

5. A lure as set forth in claim 4 wherein said appendage includes a flange that projects from the appendage and wherein the collar of said skirt is mounted over said flange and the flange is positioned to restrict the withdrawal of the collar from said cavity.

6. A lure as set forth in claim 4 wherein said appendage includes a barb.

7. A lure as set forth in claim 1 wherein said head exhibits an ellipsoid shape and wherein said eye is recessed into a channel at the head and said hook extends transverse to said head with apexes of the head positioned to the lateral sides of the hook.

8. A lure as set forth in claim 1 wherein said eye is positioned at a forward end of said head and said head exhibits tapered surfaces which flare outward as they extend aft of said eye.

9. A lure as set forth in claim 8 wherein said eye is recessed at said head into a channel.

10. A lure as set forth in claim 8 wherein said head includes a weed guard which shelters the barb.

11. A lure as set forth in claim 8 including an appendage that projects from the head coaxial and along the shank, wherein a flange radially projects from the appendage, and wherein the collar of said skirt is mounted over said flange and the flange is positioned to restrict the withdrawal of the collar from said cavity.

12. A lure as set forth in claim 11 wherein said appendage includes a barb.

13. A lure as set forth in claim 1 wherein said head is substantially round and wherein said eye is recessed into a channel at said head.

14. A lure as set forth in claim 13 wherein said head includes first and second flat surfaces and to which flat surfaces first and second plastic eyes are mounted.

15. A lure as set forth in claim 13 including an appendage that projects from the head coaxial to and along the shank, wherein a flange radially projects from the appendage, and wherein the collar of said skirt is mounted over said flange and the flange is positioned to restrict the withdrawal of the collar from said cavity.

16. A lure as set forth in claim 13 wherein said head includes a weed guard which shelters the barb.

17. A fishing lure comprising:
a) a multi-filament skirt having a collar which extends from an end of the skirt; and
b) a head molded about a fish hook, wherein the hook has an eye, a shank and a barb, wherein a cavity is formed into said head that extends coaxial to said shank, wherein said head exhibits an ellipsoid shape, and wherein said eye is recessed into a channel at the head and said hook extends transverse to said head with apexes of the head positioned to the lateral sides of the hook, whereby the collar mounts to said hook and nests into said cavity.

18. A fishing lure comprising:
a) a multi-filament skirt having a collar that extends from a first end of the skirt opposite to a second end; and
b) a head molded about a fish hook, wherein the hook has an eye, a shank and a barb, wherein said eye is positioned at a forward end of said head and is recessed at said head into a channel, wherein said head includes tapered exterior surfaces that flare outward as they extend aft of said eye, wherein said head includes a weed guard that shelters the barb, wherein an appendage extends from the head along said shank and includes a protecting flange and barb, wherein a cavity having a shape complementary to an external shape of said collar extends from an exterior surface of said head into said head a depth sufficient to receive said collar, and wherein the collar is mounted over said flange and inserted into said cavity such that the collar is restrained in the cavity by the flange and substantially concealed from the exterior surface with filaments of the second end exposed and free to move relative to said head.

19. A fishing lure comprising:
a) a multi-filament skirt having a collar which extends from an end of the skirt; and
b) a head molded about a fish hook, wherein the hook has an eye, a shank and a barb, wherein a cavity is formed into said head that extends coaxial to said shank, wherein said eye is recessed at said head into a channel, wherein said head exhibits a substantially round shape and includes first and second flat surfaces and to which flat surfaces first and second plastic eyes are mounted, wherein said head includes a weed guard which shelters the barb, wherein an appendage extends from the head along said shank and includes collar means which radially extends from a body of the appendage that extends coaxial to the shank for retaining the collar to the cavity, and wherein said appendage also includes a barb which projects from the body for retaining a second dressing to the lure.

20. A fishing lure comprising:
a) a multi-filament skirt having a collar that extends from a first end of the skirt opposite to a second end; and
b) a head molded about a fish hook, wherein the hook has an eye, a shank ad a barb, wherein said eye is recessed into a channel at a forward end of said head, wherein said head includes tapered exterior surfaces that flare outward as they extend aft of said eye, and wherein a cavity having a shape complementary to an external shape of said collar is recessed from the exterior surface of said head into said head a depth sufficient to receive said collar and define a void around the shank, and wherein the collar is substantially concealed from the exterior surface in the cavity and filaments of the second end are exposed and free to move relative to said head.

21. A lure as set forth in claim 20 wherein said head exhibits an ellipsoid shape.

22. A lure as set forth in claim 20 wherein said cavity is formed concentric to an appendage that extends from the head along said shank, wherein a flange radially projects from the appendage, and wherein the collar of said skirt is mounted over said flange and the flange is positioned to restrict the withdrawal of the collar from said cavity.

23. A fishing lure comprising:
a) a multi-element skirt having a collar that extends from a first end of the skirt opposite to a second end; and
b) a head molded about a fish hook, wherein the hook has an eye, a shank and a barb, wherein said eye is recessed into a channel at a forward end of said head, wherein the exterior surface of said head is substantially round, and wherein a cavity having a shape complementary to an external shape of said collar is recessed from the exterior surface of said head into said head a depth sufficient to receive said collar and define a void around the shank, and wherein the collar is substantially concealed from the exterior surface in the cavity and filaments of the second end are exposed and free to move relative to said head.

* * * * *